April 30, 1968

A. KRASZESKI 3,380,484

APPARATUS AND METHOD FOR MAKING VENTILATING UNITS FOR SEAT PADS

Filed Feb. 23, 1966

INVENTOR
*Arthur Kraszeski*
BY
*Harry Jacobson*
ATTORNEY

United States Patent Office 3,380,484
Patented Apr. 30, 1968

3,380,484
APPARATUS AND METHOD FOR MAKING
VENTILATING UNITS FOR SEAT PADS
Arthur Kraszeski, Newburgh, N.Y., assignor to R. O. Kent Corp., Newburgh, N.Y., a corporation of New York
Filed Feb. 23, 1966, Ser. No. 529,505
23 Claims. (Cl. 140—1)

This invention relates to the means and method for making the inner coiled wire units for ventilating seat pads and the like, and particularly to the wrapping of coiled wire around a frame in two intersecting sets of rows.

As shown in the United States Patent No. 2,801,681, ventilating seat cushions or pads have heretofore required manual assembly to a large extent. Such pads usually employ a generally rectangular wire frame or border wire, which may or may not be arranged within the leading end portion of a long length of coiled wire the succeeding part of the remainder of the length being wrapped or wound around opposite sides of the border wire in a first set of generally parallel rows, a second set of similar rows substantially perpendicular to the first set being wrapped from the trailing end portion of the same length around the two remaining opposite sides of the border wire.

Because the sides of the border wire may not be straight but are often curved, and because there may not necessarily be any coiled wire encircling the border wire with which to entangle the ends of the rows of coiled wire and thereby prevent slipping and displacement of the rows along the frame, and because adjacent sides of the frame most often are not of the same length, no automatic machinery for performing the operations heretofore performed manually has heretofore been available and manual wrapping has been the rule.

Sharp ends on the length of coiled wire, resulting from cutting are seriously objectionable and have heretofore been bent out of the way manually to avoid damage as by means of a pigtailer hand tool, which forms a pigtail bend at the extreme severed end of the wire.

An object of this invention is therefore the provision of efficient and dependable means for automatically wrapping or winding the rows of coiled wire around a frame or border wire of any of the shapes and sizes commercially acceptable and regardless of the differences in dimensions of adjacent sides of the frame.

Another object of the invention is the provision of a machine requiring no attention on the part of the operator except to replenish the supply of frames and wire, for automatically repeated cyclical operation, each operating cycle comprising the formation from straight wire of coiled wire with a portion bent out of the way at predetermined spaced intervals to form safe non-piercing ends on lengths of coiled wire, feeding frames individually to a winding station, winding the coiled wire in two sets of intersecting rows around the frame and removing the thus wrapped frame from the machine.

A further object of the invention is the provision of a method especially adapted for rapidly and efficiently making from straight wire a coiled wire unit having two sets of rows wrapped around a closed frame with or without coiled wire encircling the frame, including the steps of coiling the straight wire to produce rotating coils and simultaneously screwing said wire on to the border wire and raising, lowering and rotating the frame in the proper sequence to receive the wire.

Various other objects of the invention will appear as the description progresses and from the drawings, in which.

For a better understanding of the following description, the invention may be briefly summarized as follows:

A suitable coiler forms the coiled wire in which a pigtailer makes a double pigtail at intervals spaced to provide coiled wire lengths sufficient for the winding operations and to leave a free terminal excess which may later be tucked into place manually. The pigtailer also cuts the wire to lengths after the leading end of the coiled wire has been screwed on to the frame or border wire and the winding step has begun or is about to begin. The coils lead to the coil feeding carriage directing the coiled wire to a rotating frame to wrap the coils around the frame on a reciprocating turntable. Magnets on the turntable hold the frame until it is engaged by frame rotating discs. The carriage moves along one side of the frame in timed relation to the rotation of the discs so that the frame is horizontal at the end of each stroke of the carriage. The carriage has alternating operative and idle return strokes which may differ in length in conformity with the different lengths of the sides of the frame. The turntable moves up from a retracted position thereof to engage the frame and after the frame is released by the discs, the turntable rotates about a vertical axis a quarter turn to position the frame for the wrapping of the next set of rows. Such wrapping proceeds as before after the frame is gripped by the discs and the turntable is retracted. Finally, the wrapped frame is removed from the turntable by a take-off mechanism and discharged from the machine, thereby ending the cycle, except for some additional operation of the coiler.

Figures 1, 2, 3, 4, 5:
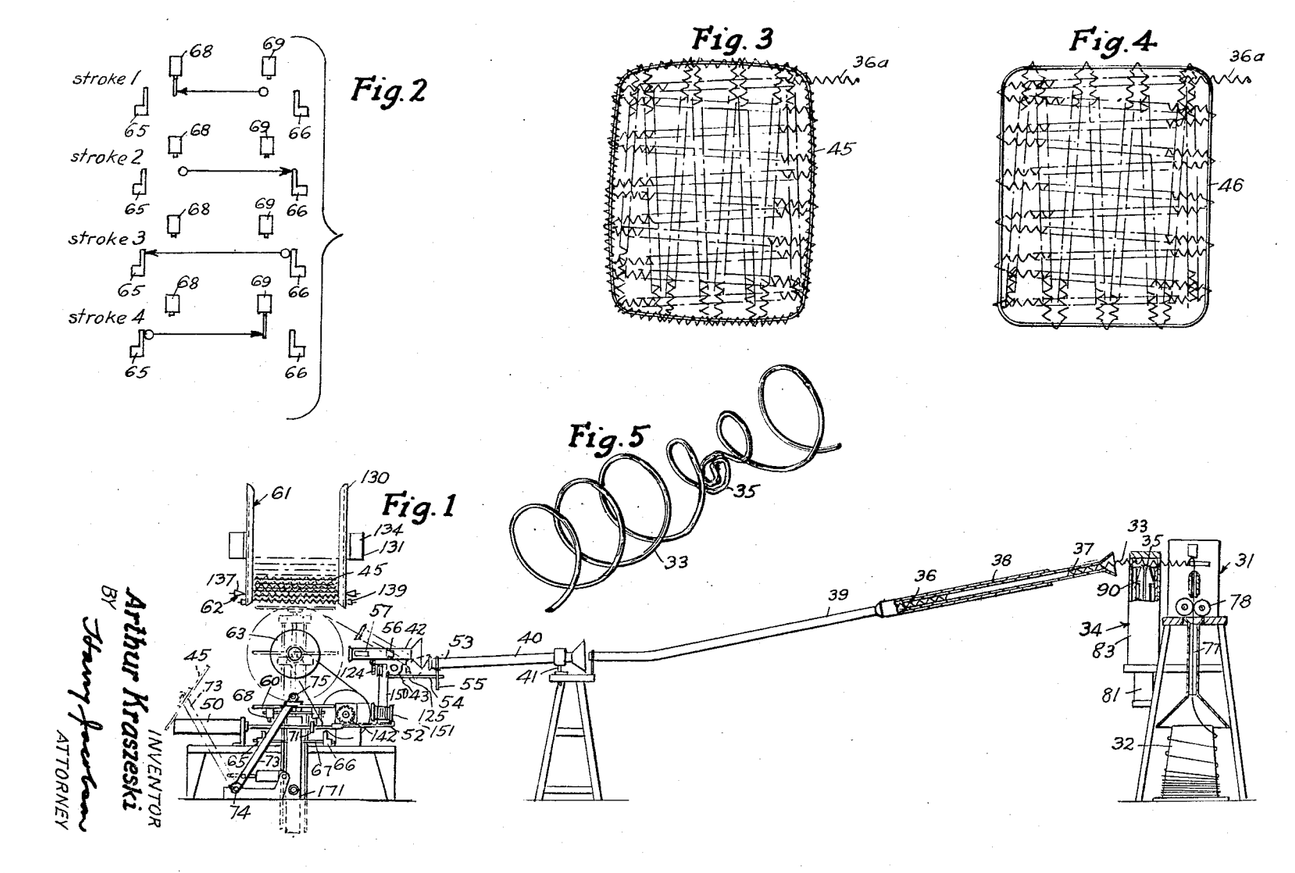
FIG. 1 is a diagrammatical side elevational view of the machine.
FIG. 2 is a similar fragmentary view of the stops for determining the lengths of successive strokes of the coil feeding means to conform to the different lengths of the sides of the frame.
FIG. 3 is an elevational view of a coiled wire unit constituting a product of the machine wherein the sides of the frame or border wire are curved and carry a border spring or frame-encircling coils.
FIG. 4 is a similar view of another form of the machine-made product wherein the sides of the frame are straight and the border spring has been omitted.
FIG. 5 is a perspective view of a piece of the coiled wire formed by the coiler at the adjacent ends of adjacent lengths, and of the double pigtail bend there formed by the pigtailer.

The complete machine is shown diagrammatically only in FIG. 1. It comprises generally the coiler 31 of any of the usual types receiving straight wire unwound from the drum 32. The coiler operates intermittently to coil the wire into coils as 33 of the desired pitch and diameter during each cycle of operation of the machine. Adjacent the coiler is the pigtailer 34 hereinafter described in detail, which, as has been indicated, makes the double pigtail 35 (FIG. 5). While the coiler is at rest, the pigtailer makes the pigtail bend at what will be the trailing end of the leading length 36 of coiled wire and the leading end of the trailing length 37, it being understood that said lengths 36 and 37 remain connected by the pigtail until cut apart by the pigtailer, which cuts the double pigtail in two. The longitudinal dimension of each length between pigtails is sufficient to pass into the guide therefor, which may be a tube or a U-shaped tray 38, thence into the tube or tray 39 and into the pivoted tube 40 which is adapted to swing about its substantially vertical axis 41. The length 36 also enters the carriage tube 42 which is carried by the carriage 43. Said carriage reciprocates on the horizontal rail 44. A few turns of the leading end portion of the length 36 are screwed on to and encircle one side of the border wire 45 or 46 (FIGS. 3 or 4) after which the double pigtail is severed to free said length.

The means for driving the carriage comprises the air cylinder 50, the piston rod 51 of which is connected to the rack 52, and certain gearing and cables shown best in FIGS. 6, 7, and 9 and which will be described in detail hereinafter. Said cylinder 50 also operates the carriage to move it from right to left for its operative wrapping strokes (as viewed in FIGS. 14–27) and from left to right during its idle return strokes as will be later described, in suitable timed relation to the coiler and the other mechanism.

Figure 25:
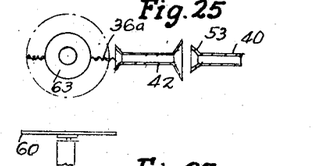
Figures 26, 27:
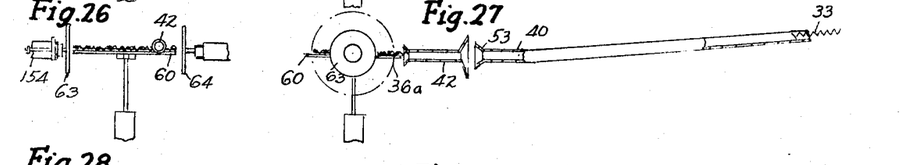

After the pigtail is severed, the coiler remains idle until the wrapping of the first set of rows is about completed, after which the coiler is actuated to make about three quarters of the succeeding length of coiled wire and is again halted until the beginning of the next cycle and until another frame is deposited at the starting station. The impulse to the coiling machine is given as the trailing end of the length passes such a point on the guide tube or tray as corresponds to the unwrapped amount of coiled wire in the length needed to wrap the second set of rows around the frame plus a free projecting trailing end portion 36a intended to be later tucked into the rows manually (FIGS. 25 and 27.)

The pivot 41 for the tube or tray 40 permits the front end 53 thereof to swing with the carriage tube as said tube 42 moves from side to side, motion of the carriage being transmitted to the tray 40 through the rod 54 projecting rearwardly from the carriage and passing through the fork 55 extending downwardly from and fixed to the tray (FIG. 1.)

Obviously, in cases where space is limited and it is desired to provide a less expensive and less complete machine, the coiler and tube guides 39 and 40 may be omitted and a prefabricated length of coiled wire with suitable safe end bends such as pigtails may be supplied to the carriage tube 42. In any case, the coiled wire length is tensioned during the wrapping operation by a suitable tensioning device associated with the carriage tube 42 and offering an adjustable amount of resistance to the advance of the wire. Such device is designated generally by the numeral 56 in FIG. 1 and will be fully described later herein. Said tensioning device 56 operates only during the wrapping operations and is released by the release mechanism 57 therefor during the time that the coiler, and not the frame rotating means, advances the coiled wire length and before the length is severed from the succeeding length.

Figures 15, 17, 19, 21, 30:
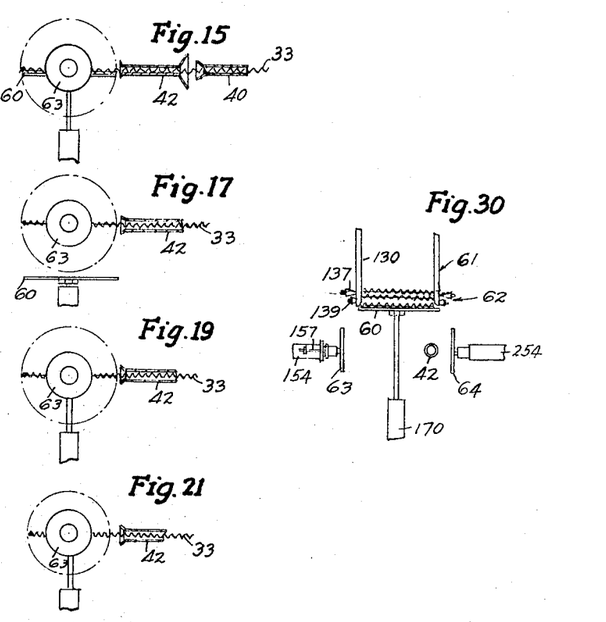
FIGS. 15, 17, 19, 21, 23, 25, 27 and 29 are respectively side elevational views of the respective FIGS. 14, 16, 18, 20, 22, 24, 26 and 28.
FIG. 30 is a fragmentary view similar to FIG. 14 of the frame feeding means showing the turntable in a frame receiving position.
Figure 18:
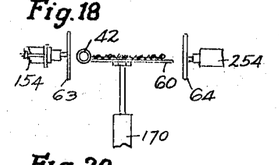
Figure 20:
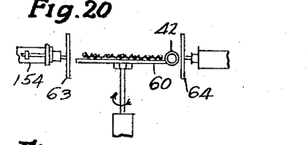
Figure 22:
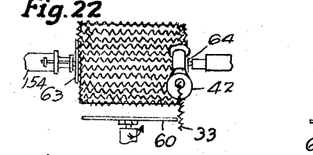
Figure 23:
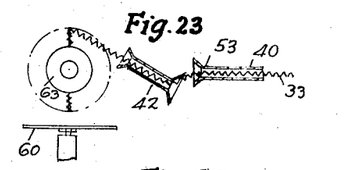
Figure 24:
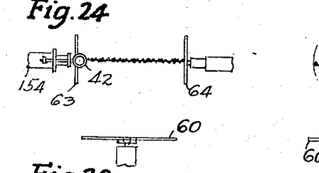

It will be understood that the frames as 45 or 46 are preferably supplied to the turntable 60 automatically but may be supplied manually if desired. As shown in FIG. 1 and elsewhere, a suitable frame hopper 61 holds a supply of frames which may be bare or encircled with a border wire or spring. A suitable frame feeding device 62 releases one frame at a time to enable the lowermost frame to drop on to the turntable 60 at the beginning of each cycle. The detailed description of the frame feed and of the turntable will follow later, as well as the detailed description of the other mechanism above mentioned. Suffice it to say at this point, that the turntable 60 may be raised as shown in FIG. 1 to an uppermost position close to the hopper 61 as shown in FIGS. 1, 7, and 30, or for simplicity, the uppermost position of the turnable may be in the horizontal plane passing through the axes of the frame rotating discs 63 and 64, which position coincides with the initial frame wrapping position. In either case, the frame feed mechanism deposits a single frame at a time from the stack of frames in the hopper on to the turntable. Suitable flared guides for the frame, open at the top and carried by the turntable, but not shown, may be employed to guide the frame, released from the hopper, towards its proper place on the turntable in the case where the turntable is not raised beyond the axes of the discs. As will be later explained, the reciprocating frame rotating discs 63, 64 serve to center the frame automatically on the turntable so that initial deposit of the frame accurately on the turntable is unnecessary.

Figures 6, 7, 8:
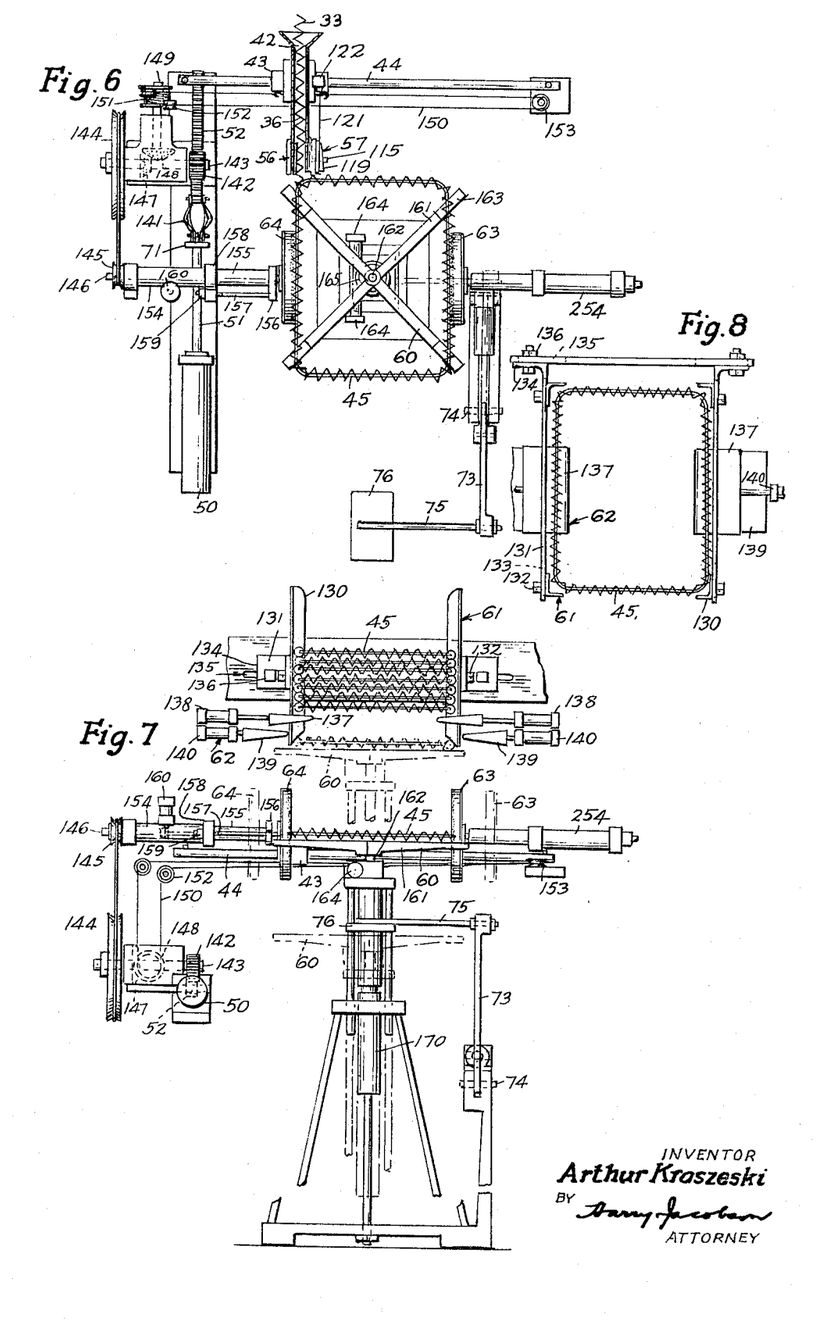
FIG. 6 is a top plan view of the turntable, the coiled wire feeding and guiding mechanism, the wrapping or winding means and the take-off means.
FIG. 7 is a rear elevational view of the same, including the means for feeding individual frames to the turntable, showing in dash-dot lines the various positions assumed by the turntable and by the frame gripping discs.
FIG. 8 is a fragmentary top plan view of the frame feeding means shown in FIG. 7.
Figures 9, 10, 11, 12, 13:
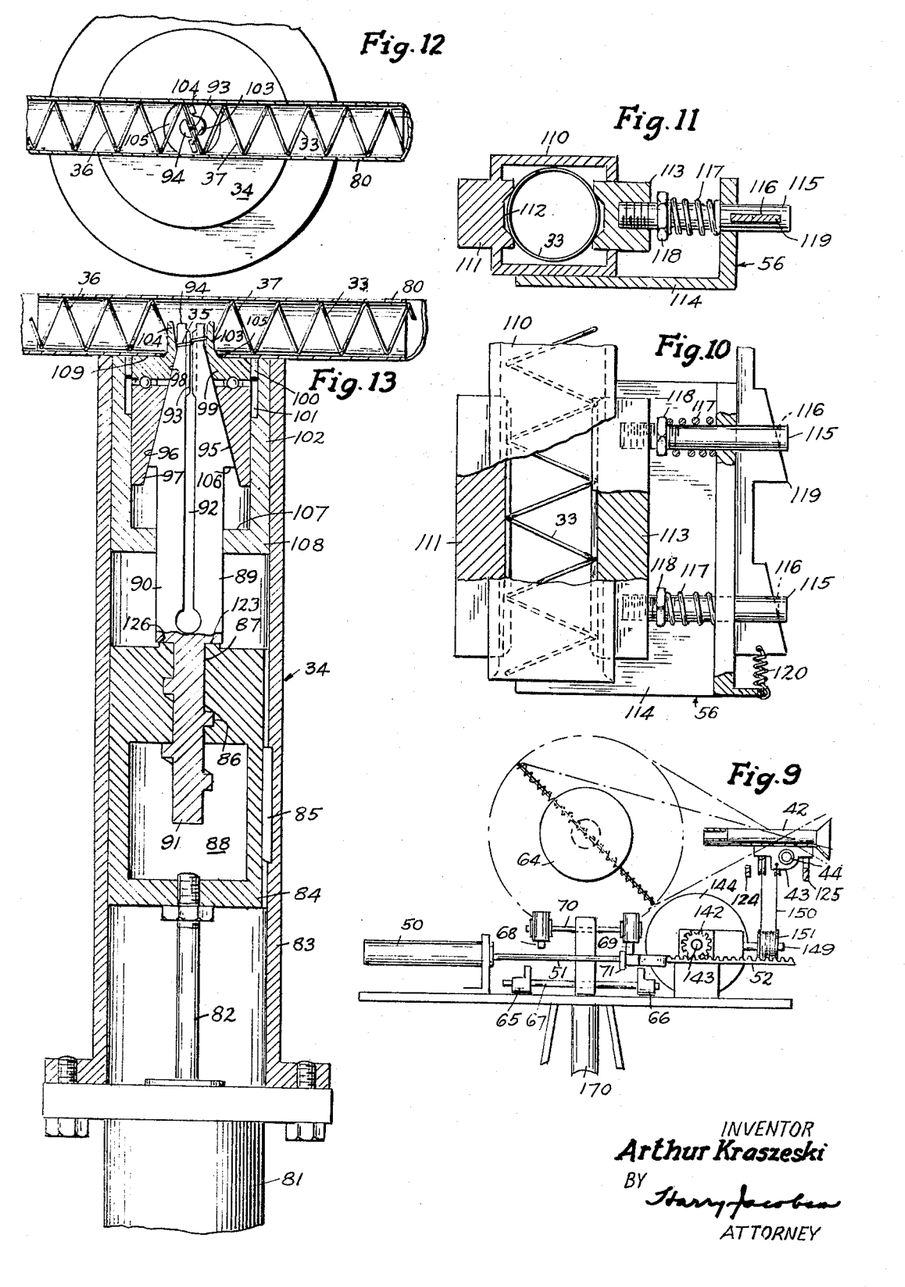
FIG. 9 is a side elevational view of the stops shown in FIG. 2, and of the driving means therefor and for the coiled wire advancing carriage.
FIG. 10 is a top plan view, partly broken away, of the tensioning means for the coiled wire guide to the carriage.
FIG. 11 is a vertical sectional view of the same.
FIG. 12 is a fragmentary horizontal sectional view of the coiled wire guide tube adjacent the coiler, showing the jaws of the pigtailer closed upon the coiled wire preparatory to forming the double pigtail.
FIG. 13 is a vertical sectional view of the pigtailer showing the jaws in their uppermost position after making the pigtail bend.

As has been indicated and as shown in FIGS. 1, 2, and 9, means are provided for changing both the lengths of both of the operative strokes of the carriage in its movements from right to left as viewed in FIG. 2 or from left to right as viewed in FIGS. 6 and 7, said means also being operative to determine the lengths of the idle return strokes of the carriage from left to right as viewed in FIG. 2 and from right to left as viewed in FIG. 6. Said means comprises in part, the limit stops 65 and 66 (FIG. 9) adjustably mounted on the rod 67 and the retractable stops 68 and 69 adjustably mounted on the rod 70. Said stops 65, 66, 68 and 69 cooperate with the reciprocating lug 71 attached to the piston rod 51 of the drive means for the carriage and for the frame rotating discs. The stops are particularly useful for frames or border wires 45, 46 in which the adjacent sides differ in length whereby the number of rows wrapped around one pair of the opposite sides of the frame differ from the number of rows wrapped about the remaining two opposite sides of the frame. As an example, the discs 63, 64 may rotate 4½ revolutions to form 9 rows in the first set across the short sides of the frame, and may rotate 5½ revolutions to make 11 rows across the long sides of the frame depending on the positions of the stops 65, 66 and 68, 69. The sequence of strokes of the lug 71 is shown in FIG. 2.

It will be understood that the driving connections from the lug 71 to the discs 63, 64 and to the carriage are so synchronized, regardless of the number of rows wrapped around the frame, that when the carriage reaches the end of its operative stroke, the frame rotating discs have rotated the frame into a substantially horizontal position coplanar with the axes of the discs, whereby the turntable 60 is capable of rising to engage and hold the frame just as the frame is released by the frame rotating means at the start of the return movement of the carriage. Such release of the frame by the discs and reengagement of the frame by the turntable is accomplished preparatory to the rotation of the frame a quarter turn in its own plane at the level of the axes of the discs, to present the long side of the rectangular frame to the carriage after the first set of rows have been wrapped around the opposed short sides.

After the second set of rows have been wrapped around the opposed long sides of the frame, and the turntable has been retracted to its lowermost or full line position shown in FIG. 1, which is the same as the lowermost dash-dot line position of FIG. 7, the take-off mechanism becomes operative to remove the completely wrapped frame with its projecting coils 36a and to discharge it from the machine. Said mechanism comprises the arm 73 (FIGS. 1, 6, and 7) pivoted near its lower end as at 74 to a suitable fixed part and carrying the horizontal extension rod 75 at its upper end, the electro-magnet 76 or suitable gripping jaws being secured to the under side of said rod in position to engage and swing the frame to the dash-dot line position shown in FIG. 1 as the arm 73 is swung about its pivot. The frame is dropped, when the electromagnet is deenergized, into a suitable chute or on to a conveyor for further processing, such as compression and distortion of the circular coils into generally elliptical form as shown in said prior Patent 2,801,681.

The trailing end 36a of the last row of the unit, may be tucked manually, if desired, into the inside of the frame to become entangled with the other rows or with the border wire coils and thereby held adequately in place. Another possible manual operation may be advisable should the corner, where the direction of the rows change between the last row of the first set and the first row of the second set, creep out of position during the wrapping operation by the machine. Such corner may, if necessary, be reformed and properly positioned manually.

It should be noted that the frame is preferably prefabricated with encircling border coils to engage the half turn bends at the connected ends of adjacent wrapped around rows of coils. Said border coils engage and become entangled with the bends and resist slippage of the rows out of place along the border wire. The border coils are especially advisable where the frame has curved sides, but in some cases, may be omitted in frames having substantially straight sides.

It will also be understood in connection with the air cylinders for actuating the various sub-mechanisms, that standard conventional controls for the cylinders are used, such as electrical synchronized timing switches resulting in the desired sequential operation, and that such switches and the locations thereof would be obvious to those skilled in the art. For purposes of simplicity and clarity, the controls for the various air-operated cylinders have not been shown nor described.

A detailed description of the various sub-mechanisms of the machine follows:

Coiler

At the start of the cycle, the coiler is at rest and has formed about three quarters of the desired length of coiled wire. Further operation of the coiler awaits the arrangement of a frame at the starting station.

The coiler is of any well known type advancing wire 77 by means of the rolls 78 from the drum 32 to the coiling device 79 which is adjustable to produce coils of the desired diameter and pitch and to insert the thus coiled wire 33 into the tube 80.

After the frame has been deposited in a horizontal position at the starting station with its short side, for example, at the front (FIGS. 14 and 15), the discs 63, 64 close upon and engage the frame. Thereafter, the turntable is retracted and the coiler is reactivated to complete the length and to screw part of the leading end of said length 36 of coiled wire on to the side of the frame adjacent the front side, after which the coiler is again halted. During the coiling operation, the length of coiled wire passes out of the tube 80 into the telescoping tubes 38 (FIG. 1) which are adjustable in length to correspond to the longitudinal dimension of the coiled wire length 36.

It will be understood that U-shaped trays or channels open at the top may be used instead of tubes to guide the wire from the coiler to the carriage 43 throughout the wire guiding means. From the tube 38, the coiler drives the wire into the oscillatory tube 40 and thence into and through the carriage tube 42 to attach the portion of the length 36 to the border coils or directly to the side of the border frame as the coiled wire length rotates. The pigtailer then makes the double pigtail and severs it to form the individual pigtails at the cut ends of the wire.

Pigtailer

The pigtail bends are made by the mechanism 34 best shown in FIGS. 12 and 13. Said mechanism comprises the air cylinder 81 having the piston rod 82 projecting into the tubular casing 83 which is secured by a suitable flange and screws to the flange of the air cylinder. The rod 82 reciprocates within the casing together with the internally threaded hollow member 84 which is prevented from turning during its movement by the key 85 inserted into suitable grooves in the member and in the inner surface of the casing. A cam groove 86 in the nature of a coarse square thread is made in the wall of the axial opening 87 of the member 84, which opening communicates with the interior space 88 of the member. Projecting downwardly from the wire bending jaws 89 and 90 of a jaw member, is the extension or rod 91 externally threaded to fit and to rotate in the cam groove 86 and entering and moving up and down the space 88.

The jaws are resilient and are normally held separated by the longitudinal groove 92 therebetween and extending from the upper ends of the jaws close to the extension 91, the groove being narrowed near the upper end thereof by the cutters or cutting edges as 93 projecting into the groove 92. At the upper ends of the jaws, the groove is again widened above the cutting edges to receive a wire coil with ease on the upward stroke of the jaw member and when the normally open jaws and the semi-cylindrical wire gripping and bending jaw tips 94 enter into the interior of the tube 80. Below and outwardly of the wire gripping tips 94 are the conical or tapered wedge-like outer surfaces 95 of the jaws, which surfaces engage the inner conical or tapered wall 96 of the reciprocating rotatable sleeve 97, and the inner conical wall 98 of the reciprocating collar 99 having side projections or lugs 100 entering the longitudinal grooves 101 in the tube 102 fixed to the inner wall of the casing 83. Said lugs 100 prevent the collar 99 from rotating on the rotation of the jaw member and hence prevent the stops 103, 104 for the coiled wire at the upper end of the collar and adjacent the jaw tips 94 from rotating during the pigtail bending operation. Said stops also control the shaping of the double pigtail and serve to prevent excessive distortion of the coils. The wire material adjacent the stops is drawn into and around the jaw tips and consequently somewhat decreases the diameters of the coils and changes the pitch thereof to an extent limited by the stops. The jaw tips 94 and stops 103, 104 enter the tube 80 at the proper time through a suitable opening 105 in the tube.

In the lowermost position of the hollow member 84, the tips of the jaw member and the stops have been withdrawn from the tube 80 to permit the coiled wire to advance and rotate uninterruptedly. The stop shoulders 106 at the bottoms of the jaws 95, 96 are in engagement with the cooperating stop surface 107 on the lower tube closing and jaw guiding wall 108 of the fixed tube 102. However, the stop 126 at the top of the member 84 has continued to move downward away from the stop shoulder 123 between the jaws and the rod 91, without rotating, to the fully retracted position of the member 84 along the casing 83 and along the threaded extension or rod 91 of the jaw member. Since the jaws 95, 96 normally spring open and press frictionally upon the parts 97 and 99, said parts move downwardly from the jaw member as a unit until stopped by the stop wall 107. For the same reason, said parts move upwardly as a unit on the up stroke of the piston rod 82 until unitary motion is halted by the stop and relative motion begins.

In operation, and while the coiler is at rest, the upward stroke of the piston rod 82, starting from its lowermost position, raises the hollow member 84 together with the jaw member which rises away from the stop 107, as well as the sleeve 97, and the collar 99 as a unit and without rotation until the coiled wire is received in the top part of the space 92 between the jaws, and until the stop shoulder 109 on the collar strikes and is halted by a suitable stop surface on the tube 80. Further upward movement of the member 84 causes the tapered surfaces on the jaw member and the sleeve 97 to become wedged together and the jaws close upon the wire enough to grip the wire for bending purposes. Still further upward movement of the piston rod and member 84 relatively to the threaded extension 91 until stopped by the engagement of the stops 123 and 126 causes rotation of the extension and movement thereof further into the space 88, and also causes rotation of the jaw member from which the extension projects through the desired angle, usually 360°. The end part of the upward stroke of the piston rod, with the various stops all engaged, further slightly raises and closes the jaws tightly enough on the wire to cut the pigtail in two.

After retraction of the piston rod 82, the leading length 36 of coiled wire is free to move under control through the various tubes 38, 39, 40 and 42 on the rotation of the frame by the discs 63, 64, the coiled wire having been tensioned slightly by the tensioning device 56. After the piston rod has been retracted and halted, the cylinder 81 is again activated at the proper time to repeat the cycle while the succeeding frame is at the starting station and after the leading end of the succeeding length 37 of coiled wire has been screwed on to a part of a side of the frame.

*Coil tensioning device and release*

An example of a suitable coiled wire tensioning device suitable for resisting, to a predetermined extent, advance of the coiled wire uncontrolledly during the wrapping operation, thereby to deposit the rows properly around the frame, is best shown in FIGS. 6, 10, and 11.

Carried by an upright side of suitable preferably square tubing as 110 on the carriage tube 42, is the fixed coil-engaging member 111 preferably notched as at 112 to receive part of a coil 33 slidable in the notch thereof. A similar adjustable coil-engaging member 113 having a similar notch therein is mounted loosely in the opposite upright side of the tubing. Fixed to the tubing 110 is the bracket 114 slidably supporting the rods 115 which are secured at one of the ends thereof to the adjustable member 113, the other ends passing slidably through the bracket and each having a slot as 116 therein.

Encircling each rod is a compression spring 117 abutting the nut 118 which is adjustably threaded on the rod, the spring being interposed between the nut and the bracket and urging the rod and the member 113, to which the rod is attached, against the coiled wire when permitted to do so by the double wedge 119 inserted into the slots 116. One unmutilated side of the wedge movably engages the adjacent face of the bracket and the opposite inclined side engages the distal walls of the slots whereby longitudinal movement of the wedges moves the rod longitudinally in one direction to exert pressure on the coiled wire or in the opposite direction to release said wire. The tension spring 120 attached to the bracket and to one end of the wedge urges said wedge in a direction which permits the spring 117 to press the member 113 into the coil tensioning position.

To adjust the device to exert the required pressure on the wire coils, the end of the wedge opposite the spring 120 (FIG. 6) is attached, as by the cable 121 to the piston rod of the air cylinder 122 supported by the carriage 43. Said cylinder pulls the cable toward the carriage just after the leading length 36 has been severed from the succeeding length and otherwise freed for wrapping around the frame deposited at the starting station.

As the length 36 passes through the carriage tube 42, it is directed by said tube to the proper point of the frame during the rotation of the frame and the operative uniform stroke of the carriage. To enable the coiled wire length to be wrapped properly around the frame, the carriage 43 is pivotally mounted on the rail 44 (FIGS. 1, 22, 23) and permits the tube 42 to be swung by the coiled wire length as part of said length is raised or lowered by the rotating frame. A suitable stop 124 (FIGS. 1 and 9) limits the angular movement of the carriage in one direction and a second stop 125 limits such movement in the opposite direction.

*Frame feeding means*

As has been indicated, the frame 45 or 46 of bare wire or encircled with border coils may be deposited on the turntable 60 automatically or manually as may be found desirable. In the feeding means 61, 62 shown in FIGS. 1 ,7, 8 and 30, the frames with border coils thereon are stacked in the hopper 61 and fed individually to the turntable in horizontal position the bottom bottom of the stack. The hopper 61 illustrated herein comprises the four corner angle members 130 adjustably secured to the slotted brakets 131 (FIGS. 7 and 8) by the bolts 132 passing through the horizontal slots 133 in the brackets to provide for adjustment from front to rear. The flange 134 of each bracket is secured by the bolt 136 to a part of the machine frame having a slot 135 therein providing adjustment from right to left whereby the hopper is adapted to receive frames of different sizes and shapes.

The stack of frames normally rests on the pair of wedges 137 (FIG. 7) which are reciprocated simultaneously in opposite directions by means of the air cylinders 138 and a suitable four way valve to release the stack (FIG. 30) to drop on to the second set of similar wedges 139 when the turntable has risen from the take-off station to the starting station or up to the bottom of the hopper. The release wedges 139 are reciprocated by a pair of air cylinders 140 similar to the cylinders 138 to move away from each other out of the hopper and to release the bottom frame at the same time that the stack supporting wedges 139 are moved toward each other enough to hold the remainder of the stack. In the uppermost dash-dot line position of the turntable shown in FIGS. 1 and 7, the bottom frame drops directly on to the magnets on the turntable to be held temporarily thereby and properly centered by the frame rotating discs 65, 66.

*Carriage feed and drive for frame rotating discs*

The carriage 43 is moved at a uniform speed along its rail 44 from the starting station to the end of its changeable operative stroke by means of the air cylinder 50 (FIGS. 1, 6, 7, and 9). Said cylinder is connected by means of its piston rod 51 and a yieldable resilient connection or shock absorber 141 to the horizontal rack 52 which meshes with the pinion 142 on the shaft 143. As best seen in FIG. 6, the connection 141 comprises a plurality of curved blade springs. On the shaft 143 is mounted the pulley 144, which through a suitable belt, drives the pulley 145 on the revoluble disc shaft 146 on which the disc 64 is mounted. On the pulley shaft 143 is also mounted the bevel gear 147 meshing with the bevel gear 148 on the cable drum shaft 149. To reciprocate the carriage 43, a cable 150 passes in a number of turns around the drum 151, one end portion of said cable being secured to a suitable hook on the carriage. The other end portion of the cable passes around the pulley 152, thence around the pulley 153 near the right-hand end of the rail 44 as viewed in FIG. 6, and thence to a hook on the carriage. Consequently, the piston rod 51 oscillates the drum 151, the cable and the carriage are pulled alternately in opposite directions through operative and inoperative strokes of predetermined exact extent determined by the limit stops 65, 66, 68, and 69 (FIG. 2). As viewed in FIG. 6, the operative stroke of the carriage is from left to right and the idle or inoperative stroke from right to left.

During both types of strokes, the discs 63 and 64 are rotated, the frame on the turntable being rotated by the discs on the operative stroke only (FIGS. 16, 17 and 22, 23) and released by the discs on the inoperative stroke (FIGS. 20, 21) of the carriage. The disc shaft 146 passes through the piston and the piston rod of the air cylinder 154 and is connected to the disc 64. Said disc is preferably faced with a suitable resilient or semi-rigid friction material such as rubber, sponge rubber, wire brush or the like, adapted to engage the coiled border wire around the frame or the bare wire of the frame, which is squeezed temporarily to a sufficient extent into the disc facing to hold it properly in place during the wrapping operation.

Adjustable means are provided to arrange the discs 63 and 64 symmetrically about the front-to-rear center line of the frame on the turntable regardless of the length or width of the frame gripped and held by the discs. As shown in FIGS. 6 and 7, said means comprises the lug 156 on the piston rod 155 of the air cylinder carrying the threaded rod 157 which slides through the fixed bracket 158 on the air cylinder 154 and carries the adjustable nut 159 at its outer end thereof outside of the bracket 158. Said bracket operates as a stop adjustably to limit the extended position of the piston rod and of the disc 64 to permit the discs to rotate the frame with its short side at the front, and to insure the symmetrical arrangement of the discs about the center of the turntable. To limit the partly retracted or extended position of the discs as when the longer sides of the frame are wrapped with the coiled wire, the stop air cylinder 160 (FIG. 7) is supported adjustably at the proper point of the air cylinder 154. The piston rod of said cylinder 160 when extended acts as a stop and arranges the disc 64 in position to engage the short side of the frame and to present the long side at the front, and remains projected into the path of and engaged by the nut 159 during the wrapping of the frame across the long sides thereof as shown by the dash-dot lines of FIG. 7. In the fully retracted position of the disc 64 shown in FIGS. 18, 20, 26, and 30, the nut 159 becomes arranged a substantial distance to the left of the stop piston rod as viewed in FIG. 7. The disc 63 needs no stops because the side of the frame engaged by said disc acts as a stop when the disc is projected thereagainst by its air cylinder 254.

Since the cylinder 50 drives both the carriage and the discs, the stroke of the piston rod 51 and the driving connections therebetween are so synchronized that the discs rotate the frame a whole number multiple of half revolutions during each stroke thereby to halt the frame in horizontal position at the beginning and end of each stroke. The frame is thereby positioned properly for engagement by the turntable.

It will be understood that the frame is rotated by the turntable a quarter turn to present adjacent sides thereof alternately to the front, that said quarter turn occurs while the discs release the frame resting on the turntable, and that the speed of the return stroke of the piston rod 51 and the rack 52 toward the rear is synchronized with the speed of the frame turning movement of the turntable.

*Turntable mechanism*

Figures 14, 16:
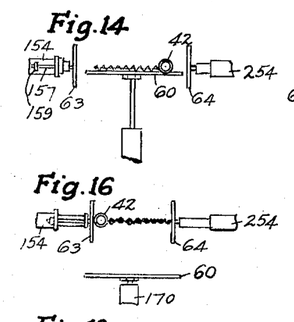
FIGS. 14, 16, 18, 20, 22, 24, 26 and 28 are fragmentary diagrammatic front elevational views of the turntable, the wire carriage and the frame gripping and rotating discs, showing the various positions assumed by the parts mentioned during a complete cycle.
Figure 28:
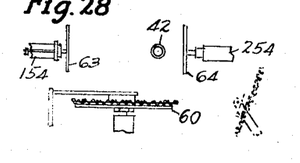
Figure 29:
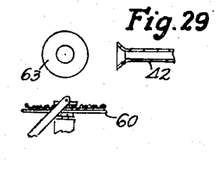

The turntable 60 preferably comprises a pair of intersecting arms 161 (FIG. 16) radiating from the upright turntable shaft 162 and provided with suitable magnets 163 at the outer ends thereof to engage and hold the frame releasably. Said shaft is operated a quarter turn first in a clockwise direction as viewed in FIG. 6 after the first set of rows is wrapped around the frame (FIGS. 20, 21) and then in a counterclockwise direction for a quarter turn after the second set of rows have been wrapped and the turntable lowered to the take-off station and the wrapped frame removed from the turntable (FIGS. 28, 29). For this purpose, there is provided a cylinder actuated rotary torque device comprising a standard pair of opposed air cylinders 164 (FIG. 6), the piston rods of which are connected by a suitable reciprocating rack not shown which operates a pinion 165 on the turntable shaft 162. Means are also provided to raise and lower the turntable during the cycle from the lowermost take-off station (FIGS. 1, 7, 28, and 29) to the starting station shown in full lines in FIG. 7 and optionally to the uppermost frame receiving station (FIG. 30). Said means comprises a two-position air cylinder in the case where the uppermost frame receiving station is not required, or a three-position air cylinder in the case where all three positions of the turntable are required. The air cylinders may be of the compound or overlapping type which is well understood and need not be illustrated nor further described, or may be of the tandem type 170 shown in FIG. 7, or of the elongated three-position type 171 with suitable stop valves for the positions and shown in FIG. 1. As has been indicated, the turntable is at the intermediate position of the three positions at the starting station wherein the horizontal frame 45 is substantially in the plane of the axes of the discs 63, 64, wherein the frame is temporarily held by the magnets 163 (FIGS. 7, 14, 15). During the first operative stroke of the carriage, the emptied turntable is lowered to the lowermost or take-off station (FIGS. 16, 17). During the first return stroke of the carriage the empty turntable is raised to hold the frame while the discs 63, 64 are retracted (FIGS. 18, 19), whereafter the turntable is operated through the first quarter turn (FIGS. 20, 21) to permit wrapping of the second set of rows. The empty turntable is again lowered to the take-off station (FIGS. 22, 23, 24, and 25) during the wrapping of the second set of rows around the frame. On the completion of such wrapping, the turntable is again raised to engage and hold the completely wrapped frame after the retraction of the discs 63, 64 (FIGS. 26, 27), and the turntable with the wrapped frame thereon is lowered to the take-off station (FIGS. 28, 29). After the take-off operation, the empty turntable is raised to the uppermost frame receiving position (FIG. 30) or to the starting position (FIG. 14) as the case may be, and the frame is deposited thereon. From the uppermost position of FIG. 30, the turntable with the frame thereon is finally lowered to the starting station (FIG. 14) preparatory to the repetition of the cycle.

*Carriage stroke adjusting means*

As indicated in FIG. 2, the operative stroke of the carriage may begin at either of the stops 66 or 69 and terminate at either of the stops 68 or 65. The inoperative or idle strokes of the carriage may begin at either of the stops 68 or 65 and terminate at either stop 69 or 66. When the short side of a rectangular frame is at the front, then the first stroke (stroke 1) of the carriage at the starting station begins at the stop 69 moving in the direction of the arrow, and terminates at the stop 68, the air cylinder of which projects its stop into the path of the lug 71 (FIG. 9) at the proper time. The idle return stroke of the carriage proceeds in the direction of the arrow of stroke 2 of FIG. 2 from the stop 68 to the fixed stop 66. After the quarter turn of the turntable, the carriage moves in the direction of the arrow of stroke 3 to the fixed stop 65 to perfrom the second wrapping operation around the long sides of the frame. Finally, the carriage is moved through stroke 4 from the fixed stop 65 to the stop 69 which is projected at the proper time into the path of the lug 71. Since all of the stops are adjustable, the rows are properly positioned around the frame and the stops are adapted to do the wrapping regardless of the varying dimensions of different frames or of the different sizes of the respective sides of the frame.

It will be understood that while the complete machine involves use of certain sub-mechanisms it may be found convenient in certain cases to dispense with such sub-mechanisms such as the coiler and the automatic frame feed. It will also be understood that various obvious changes may be made in the specific forms of the invention herein shown and described without departing from the spirit of the invention defined by the appended claims.

I claim:

1. A machine for wrapping coiled wire around a frame comprising
   a reciprocating turntable adapted releasably to hold a frame,
   a reciprocating carriage adapted to guide coiled wire around the frame to form connected rows, and
   frame rotating means for rotating the frame when the frame has been released by the turntable.

2. The machine of claim 1,
   means for retracting the turntable away from the frame while the frame is engaged by the frame rotating means,
   the frame being rotated by the frame rotating means about the axis of the frame rotating means, and
   the carriage being swingable about an axis substantially parallel to the axis of the frame rotating means.

3. The machine of claim 1,
   the turntable comprising arms extending substantially radially from and perpendicular to the axis of the turntable and
   a magnet at the outer end of each arm for releasably holding the frame,
   means to reciprocate the turntable longitudinally of said axis when the frame is released by the frame rotating means, and
   means to oscillate the turntable about said axis.

4. The machine of claim 1,
   means to determine the lengths of alternate strokes of the carriage in the same directing including a reciprocatory member having an operative connection to the carriage,
   a pair of non-retractible stops in the path of the member determining the ends of selected strokes of the carriage, and
   a pair of retractible stops individually projectible into the path of the member between the first pair of stops and retractible out of said path.

5. The machine of claim 1,
   means for reciprocating the carriage and for rotating the frame rotating means comprising
      a reciprocating member,
      means limitting the lengths of the strokes of said member,
      an operative connection between the member and the carriage, and
      an operative connection between the member and the frame rotating means to halt the frame in a plane parallel to the plane of the turntable while the frame is engaged by the frame rotating means and at the ends of selected strokes of the carriage and while the carriage is in its retracted position.

6. The machine of claim 1,
   means for guiding coiled wire to the carriage, and
   means associated with the guiding means releasably to tension said wire.

7. In a machine for making a coiled wire ventilating unit,
   a reciprocating turntable,
   means for depositing a frame on the turntable,
   a reciprocating carriage for feeding coiled wire around the frame,
   frame rotating means for alternately engaging and releasing the frame,
   means for retracting the turntable away from the frame while the frame is engaged by the frame rotating means, and
   means to rotate the frame rotating means to wrap the coiled wire in rows around the frame during the reciprocation of the carriage and while the turntable is retracted.

8. The machine of claim 7,
   the carriage having an operative feeding stroke and an idle return stroke,
   means to give the turntable a quarter turn after each operative stroke of the carriage thereby to present adjacent sides of the frame alternately to the carriage.

9. The machine of claim 7,
   a wire coiler, and
   coiled wire guiding means interposed between the coiler and the carriage.

10. The machine of claim 9,
    the coiler operating intermittently, and
    means for forming a double pigtail bend at spaced intervals in the coiled wire while the coiler is at rest and for severing the wire at said bend to form simultaneously a terminal pigtail at the trailing end of the leading length of coiled wire and at the leading end of the next succeeding length of coiled wire.

11. The machine of claim 9, and
    means for removing the finished frame with the coiled wire wrapped thereabout from the machine.

12. The machine of claim 9,
    the turntable, the carriage, the frame rotating means and the coiler operating in timed relation to each other first to screw the leading end portion of a length of coiled wire around and to encircle part of one side of the frame,
    then to wrap a first set of a predetermined number of rows of coiled wire around those opposite sides of the frame adjacent to said one side,
    then to turn the frame through a quarter turn and
    finally to wrap a second set of a predetermined number of rows of coiled wire around the frame in substantially perpendicular relation to the first set and to leave a free trailing end portion of the coiled wire projecting beyond the frame from the last row of the second set.

13. The machine of claim 9,
    means for forming a double pigtail bend at a selected intermediate point of the coiled wire formed by the coiler, and for severing the bend to form two separate terminal pigtails.

14. The machine of claim 9, and
    wire cutting means between the coiler and the carriage.

15. The machine of claim 14,
    the cutting means predetermining the dimension of each length of coiled wire fed to the carriage on two successive strokes of the carriage in the same direction, said length being sufficient to permit the coiler to screw the leading end portion of the length on to a side of the frame, to wrap two mutually perpendicular sets of rows of coiled wire around the frame and to leave a free trailing end portion of the coiled wire projecting from the last wrapped row, and
    means for changing the lengths of the respective strokes of the carriage to correspond to differences in the sizes of adjacent sides of the frame.

16. Means for forming and severing a double pigtail bend intermediate the ends of a length of coiled wire comprising
    a bifurcated jaw member having a pair of resilient wire-engaging and wire-severing jaws normally separated by a longitudinal space therebetween for the reception of part of the wire,
    means for reciprocating and rotating said member first to close the jaws on the wire and then to form a double pigtail, and then to sever the pigtail, and
    means to control the movement of the coils of the wire adjacent the jaws during the rotation of the member and prior to the severing of the double pigtail by the jaws at the extreme end of a stroke of the jaw member.

17. The bend forming and severing means of claim 16, the jaw member having semi-cylindrical tips at one end thereof and having cutting edges projecting at said tips into the space between the jaws and adapted to grip and hold the wire during the rotation of the member, an externally threaded extension at the other end of the member, the means for reciprocating and rotating the jaw member comprising tapered sides on the member, a rotatable member having a tapered opening receiving the tapered sides of the jaw member and movable as a unit with the jaw member on the retracting stroke of the jaw member away from the wire, and a reciprocating internally threaded member receiving the threaded extension, the means to control the movement of the coils comprising opposed stops projecting from the end of the rotatable member alongside the tips of the jaw member.

18. The bend forming and severing means of claim 16, a coiler for intermittently forming lengths of coiled wire, a tube for the reception of the wire and having an opening therein receiving the end of the jaw member and the means for controlling the movement of the coils at said stroke of the jaw member.

19. The bend forming and severing means of claim 18, and means for wrapping the severed length about a frame.

20. The method of making a coiled wire unit for a ventilating pad comprising supplying a wire frame held in a horizontal position at a starting station, screwing the leading end portion of a length of coiled wire initially at said station around part of one side of the frame, then winding the coiled wire around the two opposite sides of the frame adjacent said one side, rotating the frame about a horizontal axis while tensioning the coiled wire and moving said wire in a direction parallel to one of said opposite sides at a uniform speed and until a predetermined number of connected adjacent rows of coiled wire are wrapped around the frame, then halting the frame in a horizontal position, turning the frame through approximately 90° in the plane of the frame, carrying the remaining unwrapped part of the coiled wire length back toward the starting station while the frame is at rest, then performing a second wrapping operation similar to and in the same direction as the first wrapping operation.

21. The unit making method of claim 20, forming and intermittently feeding coiled wire, making a double pigtail bend at spaced apart intervals in the wire, severing the double pigtail at the center thereof to cut the wire into predetermined lengths and to leave a single terminal pigtail at each of the adjacent cut ends of the wire.

22. The unit making method of claim 20, leaving a free end portion at the end of the last formed row to project beyond the frame in position to be turned back on to and entangled with the rows.

23. The unit making method of claim 21, feeding frames successively to the starting station, and removing the wrapped unit from said station.

References Cited

UNITED STATES PATENTS

| | | | |
|---|---|---|---|
| 2,856,969 | 10/1958 | Waful | 140—102 |
| 3,192,963 | 7/1965 | Barbou | 140—112 |

CHARLES W. LANHAM, *Primary Examiner.*

L. A. LARSON, *Assistant Examiner.*